June 29, 1965  C. B. GWYN, JR ETAL  3,191,274
METHOD OF MAKING AN ELECTRICAL CONTACT
Filed Feb. 20, 1961
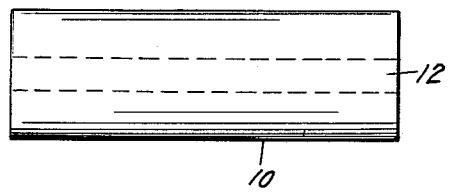
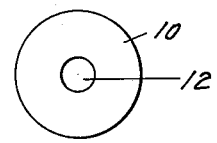
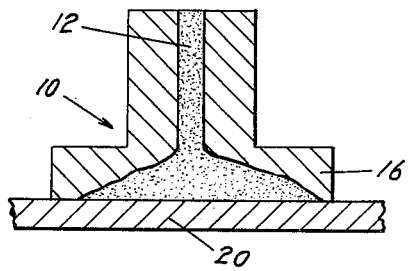
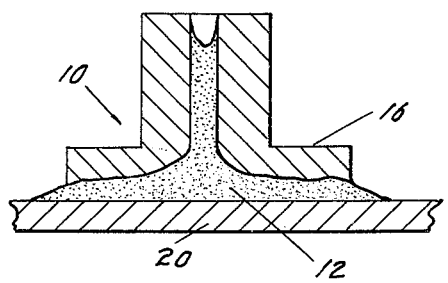
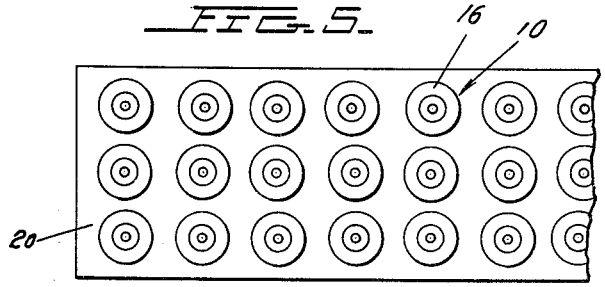
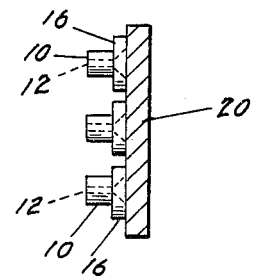
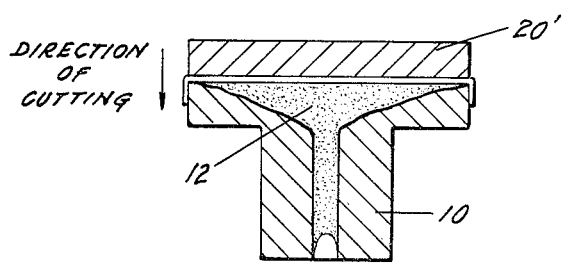
INVENTORS
CHILDRESS B. GWYN, JR,
FREDERICK R. FARNHAM
BY
OSTROLENK, FABER, GERB & SOFFEN
ATTORNEYS

United States Patent Office 3,191,274
Patented June 29, 1965

3,191,274
METHOD OF MAKING AN ELECTRICAL CONTACT
Childress B. Gwyn, Jr., Export, and Frederick R. Farnham, Pittsburgh, Pa., assignors, by mesne assignments, to Talon, Inc., a corporation of Pennsylvania
Filed Feb. 20, 1961, Ser. No. 90,571
3 Claims. (Cl. 29—155.55)

This invention relates to electrical contact rivets and more particularly to contact rivets of the type having a shank and subhead of one material and a contact facing of another material.

In the prior art, there are various methods of making contact rivets which generally require the use of jigs, tools, and fixtures for holding rivet components in place while they are being soldered or welded together. For example, a base metal shank and subhead of a rivet forms one component of a composite rivet, while a precious metal facing secured to the subhead forms another component thereof. In assembling such components in prior art methods, there is frequent difficulty resulting in waste due to the fact that the components must be held accurately aligned while being heated and cooled for soldering or welding together, and due to the further fact that misalignment frequently results in a distorted final article, which must be rejected.

Such difficulties are generally encountered in making electrical contact rivets comprising silver facing discs which are soldered or otherwise secured by heat treatment to a shank which usually comprises an integral flanged subhead to which the silver facing is attached. In addition to the heat processing, there are also certain mechanical steps, such as blanking and punching, all of which must be performed accurately so that the final assembly provides a smooth and symmetrical article. Thus, due to the sequence of a plurality of steps such as blanking, punching, aligning, brazing, soldering, welding, and subsequent cooling, defects occur at one or more points which result in waste and increased production expense.

Another drawback of prior art methods is the fact that the flowable metallic joining material, such as a solder or brazing compound, sometimes flows around to the face of the contact metal; that is, the silver facing disc, thus virtually destroying the utility of such face for electrical contact purposes. The slightest imperfection in the use of the prior art methods, such as slight misalignment of the holding jig during the course of heat treating and cooling might cause such difficulty, or poor heating control.

Further, it has been generally necessary to use prior art methods in a neutral or reducing atmosphere during the course of heating, an additional complication.

It is an object of the present invention to overcome the drawbacks of the prior art as generally described above by providing a simple process of assembling the precious metal facing and the base metal subhead and shank for electrical contact rivets.

It is another object of the invention to provide a contact rivet which is strong and electrically and mechanically sound.

Other objects and features of the invention will be apparent from the detailed description to follow.

Briefly, our invention contemplates providing a copper or steel wire, or wire of other base metal having a core of brazing alloy or solder, which wire may be cut into segments. Each segment is then cold headed, thus forming the shank and flanged subhead of what may be referred to for convenience as a subrivet. In such cold heading, the brazing alloy or solder is substantially spread across the face of the subhead for intimate contact with a precious metal facing next applied. The cold-headed subrivet may merely be placed subhead down, on a sheet of precious metal facing material. For example, silver or silver alloy or the like, and upon heating the composite assembly such subhead adheres to the silver sheet. Thereafter, by the use of a properly sized punch or cutting tool the brazed or soldered assembly is removed from the sheet as a symmetrical, neatly and cleanly cut, electrical contact rivet.

By suitable design of dimensions and proportions, the amount of waste cut away of the subhead and the facing precious metal material may be reduced to a minimum. Further, for purposes of mass production a considerable quantity of the subrivets may be placed, subhead down, in a geometric pattern, on a large sheet of facing material, heat then applied to the entire array, and after fusing of all subheads with the facing sheet, the rivets are simply punched out from the sheet, one at a time, or with a gang punch.

A detailed description of the invention now follows in conjunction with the appended drawing, in which:

FIGURE 1 is an elevation showing a segment of brazing alloy or solder cored wire.

FIGURE 2 is an end view thereof.

FIGURE 3 is a cross-section of the integral subhead and shank after cold heading to form a subrivet shown as placed on a sheet of facing material, e.g. silver.

FIGURE 4 shows the same assembly as FIGURE 3, but after a heating process has taken place causing flow of the brazing alloy or solder and alloying of the subhead material.

FIGURE 5 shows a schematic arrangement in plan view of a ganging of the subrivets on a sheet of facing metal for mass production.

FIGURE 6 is an end view of FIGURE 5.

FIGURE 7 shows the finished, punched out rivet.

Referring now to FIGURES 1 and 2, there is shown a segment 10 of a wire which may be of copper, steel, or nickel clad copper, etc., or any other readily workable metal, to form the subrivet. The segment is provided with a core 12 of any suitable brazing alloy or solder, or the like, depending, of course, on the nature of the precious metal contact material to be secured. It will be understood that the segments 10 may be cut from a continuous coil or roll of wire material.

Referring now to FIGURE 3 the cold heading step has been taken and one end of the segment 10 has been flanged out at 16 in a conventional manner, as by a cold heading machine to form a subhead. It will be noted that the core material 12 has likewise been spread out or expanded across the face of flange 16. The subhead is then simply placed on a precious metal sheet 20 of silver, or the like, with the core material in contiguity therewith. The sheet 20 may be as extensive as desired, depending upon the particular mass production operation planned. In other words, as shown in FIGURE 5 a large quantity of headed rivet bases may be placed, face down, on a single sheet 20.

After the placing of the subheads on the precious metal sheet, heat is applied, which gives a condition for each subhead as shown in FIGURE 4 wherein it will be noted that the core material 12 has melted and flows outwardly beyond the periphery of the subhead flange 16 and, in fact, flows to a certain extent, out onto the sheet 20. Such flow is believed to be due to capillary attraction and the effect is to cause full alloying and adherence of the entire contiguous surface of subhead flange 16 with the material of sheet 20.

It will further be noted that it is not physically possible for the core material to flow onto the contact face surface on the lower side of sheet 20. Further, the heating process may be carried out without resorting to a neutral or reducing atmosphere for the reason that the mating interfaces of the cored body and the contact facing material are maintained so closely in physical contact that deleterious oxidation actions, if any occur, are of negligible or acceptable value, and the flow and wetting action of the brazing or soldering core medium is not inhibited and a suitable and satisfactory permanent bonding is readily achieved.

As shown in FIGURES 5 and 6, a large plurality of the subrivets may be laid out in geometric pattern on the silver facing sheet 20 prior to heating. Such heating may take place in various ways, as by inserting the entire arrangement into an oven or furnace, or by inductive heating, or convection or radiant heating of suitable degree, or by various types of commercial torches.

Subsequent to the fusing of the cores and outward spreading thereof to form the condition shown in FIGURE 4 for each of the rivets, such rivets may be individually or gang punched from the sheet to give the final article as shown in cross-section in FIGURE 7. Thus, a hollow cutting die of the exact diameter of flange 16 may be utilized or, if desired, a somewhat smaller cutting die having a diameter less than the full diameter of the flange 16 may be utilized. In any event, it will be noted that a certain amount of the core material will, during the course of the cutting operation, be forced peripherally into a cladding or sheathing coating around the edge of the surface of the silver facing disc 20. This is due to the fact that there is a slight surplus of such core medium formed around the flange 16 at the end of the heating and cooling process, as exemplified in FIGURE 4, such surplus generally forming a kind of fillet. However, by sharp and proper cut off such surplus is left on the back side of the contact material sheet 20, with little or no transfer occurring to the edges of the contact disc as shown in FIGURE 7 and the working face of the contact disc material, FIGURE 7, is completely free of any contamination from or coating of the brazing soldering mediums, thereby eliminating one drawback of the prior art, and still further, due to the final cut off step, in which a die is used that is centered with respect to the rivet shank, "off center" assemblies are virtually eliminated.

From the above description it will be apparent that the drawbacks of the prior art relating to misalignment of the rivet parts the problem of the excess brazing or soldering material, and the expense of special work holding tools and fixtures and the need for a neutral or reducing atmosphere have all been eliminated by the novel method hereinabove described.

Having thus described our invention, we are aware that various changes may be made without departing from the spirit thereof and, accordingly, we do not seek to be limited to the precise illustration herein given, except as set forth in the appended claims.

We claim:

1. A method of making electrical contact rivets which comprises
    (a) providing a generally cylindrical contact body component constituted of a base metal and having a core of an alloying material which melts at a lower temperature than said base metal, said alloying material being selected from the group consisting of brazing and soldering alloys;
    (b) cold heading said body component to form a flanged subhead in which at least a portion of the alloying material of said core is spread across the exposed face of said subhead permitting intimate contact with a precious metal contact facing material, as set forth hereinafter;
    (c) placing a plurality of said contact body components against aligned areas of a sheet constituted of said precious metal contact facing material with said exposed face of the subhead of each of said components intimately contacting corresponding aligned areas of said sheet;
    (d) heating the resulting composite assembly to effect melting of said alloying material across the interface between each said subhead and the aligned area of said sheet of contact facing material;
    (e) cooling the composite assembly to bond said contact body components and said aligned areas and thereby form a plurality of integral composite contacts therefrom; and
    (f) removing said plurality of integral composite contacts from said sheet.

2. The method as defined in claim 1 in which, in step (d), the alloying material flows across the interface between each said subhead and each said aligned area and flows beyond the peripheral edges of each said subhead; and in which each of the plurality of integral composite contacts formed in step (e) is removed from the contact facing sheet in step (f) by punching the same adjacent the peripheral edges of the subhead thereof in order to effectively prevent an excess of said alloying material from forming a sheathing coating on the periphery of the desired ultimate contact face.

3. The method as defined in claim 1, in which each of said contact body components comprises a wire segment constituted of a material selected from the group consisting of copper and steel wire, having a core constituted of a material selected from the group consisting of brazing and soldering alloys; and in which said sheet of contact facing material is constituted of a precious metal selected from the group consisting of silver and silver alloys.

References Cited by the Examiner

UNITED STATES PATENTS

| | | | |
|---|---|---|---|
| 2,137,617 | 11/38 | Imes et al. | 29—155.55 |
| 2,199,240 | 4/40 | Gwyn | 200—166 |
| 2,216,510 | 10/40 | Burns | 29—155.55 |
| 2,568,242 | 9/51 | Matteson | 200—166 |
| 2,646,613 | 7/53 | Enzler | 29—155.55 |
| 2,694,126 | 11/54 | Binstock | 200—166 |
| 2,703,998 | 3/55 | Sowter | 29—470.1 |
| 2,739,369 | 3/56 | Cooney | 29—497.5 X |
| 2,739,370 | 3/56 | Cooney | 29—155.55 |

WHITMORE A. WILTZ, *Primary Examiner.*

RICHARD M. WOOD, JOHN F. CAMPBELL,
*Examiners.*